US011968654B2

(12) United States Patent
Sevindik

(10) Patent No.: US 11,968,654 B2
(45) Date of Patent: Apr. 23, 2024

(54) HEARTBEAT MANAGEMENT IN WIRELESS COMMUNICATION NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 421 days.

(21) Appl. No.: 17/308,425

(22) Filed: May 5, 2021

(65) Prior Publication Data

US 2022/0361171 A1 Nov. 10, 2022

(51) Int. Cl.
*H04W 72/04* (2023.01)
*H04W 72/0453* (2023.01)
*H04W 72/51* (2023.01)
*H04W 88/08* (2009.01)

(52) U.S. Cl.
CPC ....... *H04W 72/0453* (2013.01); *H04W 72/51* (2023.01); *H04W 88/08* (2013.01)

(58) Field of Classification Search
CPC ............. H04W 72/0453; H04W 72/51
See application file for complete search history.

(56) References Cited

U.S. PATENT DOCUMENTS

| 8,582,483 | B1 * | 11/2013 | Yu | H04W 76/28 |
| 9,014,118 | B2 * | 4/2015 | Proctor | H04W 74/04 |
| 10,477,491 | B2 | 11/2019 | Mueck et al. | |
| 10,623,943 | B1 | 4/2020 | Sevindik et al. | |
| 10,893,417 | B1 | 1/2021 | Gandhi et al. | |
| 11,272,575 | B1 | 3/2022 | Sevindik | |
| 11,617,182 | B2 | 3/2023 | Sevindik | |
| 2010/0141762 | A1 | 6/2010 | Siann et al. | |
| 2014/0185580 | A1 | 7/2014 | Fang et al. | |
| 2016/0112970 | A1 | 4/2016 | Chen et al. | |
| 2016/0212624 | A1 | 7/2016 | Mueck et al. | |
| 2016/0219608 | A1 | 7/2016 | Awoniyi-Oteri et al. | |
| 2017/0374557 | A1 | 12/2017 | Mueck et al. | |
| 2018/0049213 | A1 | 2/2018 | Gholmieh et al. | |

(Continued)

OTHER PUBLICATIONS

Khalid, Saran. U.S. Appl. No. 18/181,124, filed Mar. 9, 2023, (22 pages).

(Continued)

*Primary Examiner* — Ronald B Abelson
(74) *Attorney, Agent, or Firm* — Mendelsohn Dunleavy, P.C.; Steve Mendelsohn

(57) ABSTRACT

In a (5G CBRS) network having a (CBSD) base station communicating with a (SAS) bandwidth manager via a cable modem (CM), the CM maintains a long timer and a short timer for each bandwidth allocation to the CBSD. When the CM receives a heartbeat message from the CBSD, the CM re-starts the long and short timers and transmits the heartbeat message to the SAS. When the short timer expires, the CM re-starts the short timer and transmits a copy of the stored heartbeat message to the SAS. When the long timer expires, the CM stops transmitting a copy of the stored heartbeat message to the SAS. In this way, the CM effectively extends the time limit before the SAS will de-allocate bandwidth from the CBSD to handle situations where the CBSD is temporarily unable to send heartbeat messages to the SAS even though the CBSD still needs the allocated bandwidth.

20 Claims, 2 Drawing Sheets

(56) References Cited

U.S. PATENT DOCUMENTS

| | | |
|---|---|---|
| 2018/0070380 A1 | 3/2018 | Nagaraja et al. |
| 2018/0098289 A1 | 4/2018 | Visotsky et al. |
| 2018/0205437 A1 | 7/2018 | Kim et al. |
| 2018/0278298 A1 | 9/2018 | Takano |
| 2018/0287722 A1 | 10/2018 | Takano |
| 2019/0174554 A1 | 6/2019 | Deenoo et al. |
| 2019/0215698 A1 | 7/2019 | Balachandran et al. |
| 2019/0306850 A1 | 10/2019 | Zhang et al. |
| 2020/0008081 A1 | 1/2020 | Ashrafi |
| 2020/0068548 A1 | 2/2020 | Guan et al. |
| 2020/0084780 A1 | 3/2020 | Wiatrowski et al. |
| 2020/0329523 A1 | 10/2020 | Yi et al. |
| 2020/0351818 A1 | 11/2020 | Park et al. |
| 2021/0014693 A1 | 1/2021 | Syed et al. |
| 2021/0029549 A1 | 1/2021 | Notargiacomo et al. |
| 2021/0227396 A1 | 7/2021 | Khalid et al. |
| 2021/0266209 A1 | 8/2021 | Zach et al. |
| 2021/0337391 A1 | 10/2021 | Sevindik et al. |
| 2022/0007200 A1 | 1/2022 | Sevindik et al. |
| 2022/0007374 A1 | 1/2022 | Sevindik et al. |
| 2022/0386131 A1 | 12/2022 | Guo et al. |
| 2022/0386132 A1 | 12/2022 | Sevindik |

OTHER PUBLICATIONS

Non-Final Office Action for U.S. Appl. No. 17/329,427; dated Sep. 12, 2023 (10 pages).

* cited by examiner

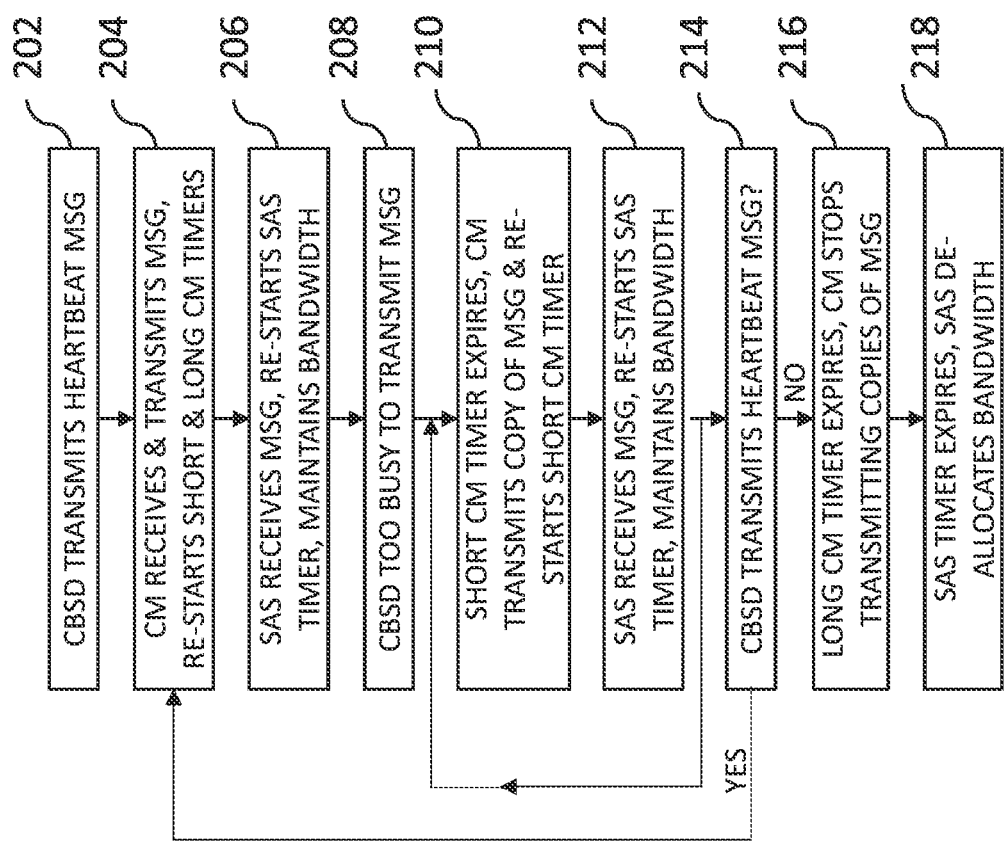

HEARTBEAT MANAGEMENT IN WIRELESS COMMUNICATION NETWORKS

BACKGROUND

Field of the Disclosure

The present disclosure relates to wireless communications and, more specifically but not exclusively, to heartbeat management in wireless networks, such as 5G CBRS networks.

Description of the Related Art

This section introduces aspects that may help facilitate a better understanding of the disclosure. Accordingly, the statements of this section are to be read in this light and are not to be understood as admissions about what is prior art or what is not prior art.

In a 5G Citizens Broadband Radio Service (CBRS) network, a Spectrum Access System (SAS) is responsible for allocating wireless bandwidth to a number of different base stations referred to as CBRS Devices or CBSDs, for short, where each CBSD may have one or more concurrent allocations of the same or different amounts of bandwidth. In order to maintain each allocation of bandwidth, a CBSD is required to send periodic heartbeat messages to the SAS, which maintains a timer for each different bandwidth allocation to each different CBSD. Each heartbeat message identifies the CBSD and the particular bandwidth allocation using the unique grant ID assigned by the SAS when the bandwidth was allocated. When the CBSD no longer needs a particular bandwidth allocation, the CBSD stops sending the heartbeat messages for that allocation. If and when the SAS fails to receive a heartbeat message from a CBSD for a particular bandwidth allocation within a specified period of time, then the SAS will remove that bandwidth allocation from that CBSD.

There are situations when a CBSD is temporarily unable to send heartbeat messages for one or more or even all of its bandwidth allocations even though the CBSD still needs those allocations. For example, a CBSD may be overloaded by user traffic servicing a large number of wireless customers to send heartbeat messages quickly enough, or a CBSD may be unresponsive because of software or hardware issues, or a CBSD may have critical alarms preventing normal CBSD operation. In those situations, the SAS might not receive a heartbeat message before the timer for a particular bandwidth allocation to that CBSD expires. As a result, the SAS will de-allocate that bandwidth from that CBSD even though the CBSD still needs that bandwidth.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 2 is flow diagram depicting a scenario for an implementation of FIG. 1.

DETAILED DESCRIPTION

Figure 1:
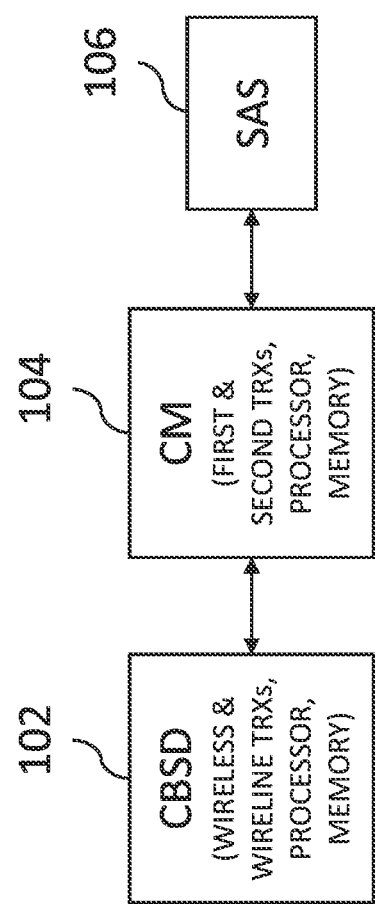
FIG. 1 is a simplified block diagram of a 5G CBRS network according to certain embodiments of the disclosure.

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may be performed out of the order noted in the figures. For example, two figures shown in succession may in fact be executed substantially concurrently or may sometimes be executed in the reverse order, depending upon the functions/acts involved.

FIG. 1 is a simplified block diagram of a 5G CBRS network 100 according to certain embodiments of the disclosure. As depicted in FIG. 1, a CBSD 102 communicates with a SAS 106 via a cable modem (CM) 104, where the CM 104 forwards heartbeat and other messages received from the CBSD 102 to the SAS 106. Although not shown in FIG. 1, the network 100 may have additional CBSDs, each with its own associated CM. Furthermore, the SAS 106 may communicate with other SASs of other networks that are not shown in FIG. 1 to coordinate the allocation of bandwidth to the various CBSDs of all of the networks.

The CM 104 (i) determines that a message received from the CBSD 102 is a heartbeat message, (ii) stores a copy of that message, and (iii) forwards a copy of that message to the SAS 106. In addition, the CM 104 maintains two timers for each allocation of bandwidth to the CBSD 102: a short CM timer whose duration is a little bit shorter than the duration of the SAS timer maintained by the SAS 106 for that bandwidth allocation to the CBSD 102 and a long CM timer whose duration is significantly longer than the duration of the SAS timer. The CM 104 operates according to the following rules for each bandwidth allocation to the CBSD 102:

Whenever the CM 104 receives a heartbeat message from the CBSD 102 and forwards that heartbeat message to the SAS 106, the CM 104 re-starts (i.e., re-initializes, resets) the short and long CM timers for that bandwidth allocation to the CBSD 102. (Note that the SAS 106 re-starts its SAS timer for that bandwidth allocation to the CBSD 102 whenever the SAS 106 receives a heartbeat message for that bandwidth allocation);

If the CM 104 fails to receive a heartbeat message from the CBSD 102 for that bandwidth allocation before the short CM timer expires, then the CM 104 transmits a copy of its stored heartbeat message for that bandwidth allocation to the SAS 106 and re-starts the short CM timer, while continuing to allow the long CM timer to run without re-initialization; and If the CM 104 fails to receive a heartbeat message from the CBSD 102 for that bandwidth allocation before the long CM timer expires, then the CM 104 stops sending copies of the stored heartbeat message for that bandwidth allocation to the SAS 106.

In this way, the CM 104 effectively extends the time limit before the SAS 106 will de-allocate bandwidth from the CBSD 102 to handle situations where the CBSD 102 is temporarily unable to send heartbeat messages to the SAS 106 even though the CBSD 102 still needs the allocated bandwidth.

Assume, for example, that the SAS timer maintained by the SAS 106 for the CBSD 102 is one minute long. In that case, the CBSD 102 may be configured to transmit a periodic heartbeat message every, for example, 45 seconds, the short CM timer maintained by the CM 104 for that CBSD 102 may be, for example, 50 seconds long, and the long CM timer may be, for example, 30 minutes long. Assume further that there is a situation in which the CBSD 102 is going to be too busy servicing wireless customers to send any heartbeat messages for 25 minutes. In that situation, under the prior art, when the SAS timer expires after the first minute, the SAS 106 will de-allocate bandwidth from the CBSD 102, even though the CBSD 102 still needs that bandwidth.

FIG. 2 is flow diagram depicting the same scenario according to the embodiment of the disclosure described above for a particular bandwidth allocation. Note that the same processing is performed in parallel for each different bandwidth allocation. In step 202, just before the beginning of the 25-minute period in which the CBSD 102 is too busy, the CBSD 102 transmits one of its normal, periodic heartbeat messages; in step 204, the CM 104 receives the heartbeat message from the CBSD 102, forwards the heartbeat message to the SAS 106, and re-starts its short and long CM timers; and, in step 206, the SAS 106 receives the heartbeat message, re-starts its SAS timer for the CBSD 102, and maintains the allocated bandwidth for the CBSD 102.

Because, in step 208, the CBSD 102 is now too busy to send any heartbeat messages, in step 210, the short CM timer expires after 50 seconds causing the CM 104 to transmit a copy of its stored heartbeat message and re-start the short CM timer. Because the SAS 106 receives a heartbeat message for the CBSD 102 before its one-minute SAS timer expires, in step 212, the SAS 106 re-starts its SAS timer for the CBSD 102 and maintains the allocated bandwidth for the CBSD 102.

With the CBSD 102 continuing to be too busy to send any heartbeat messages, the short CM timer will continue to expire every 50 seconds causing the CM 104 to continue to repeat step 210 to re-start the short CM timer and transmit another copy of its stored heartbeat message, which, in turn, causes the SAS 106 to repeat step 212 to re-start its SAS timer and maintain the allocated bandwidth for the CBSD 102.

At the end of the 25-minute period prior to the expiration of the long CM timer, the CBSD 102 will again be able to transmit a heartbeat message to the SAS 106 at step 214. In that case, with each detected heartbeat message, the CM 104 will re-start both its short CM timer and its long CM timer as in step 204, and the SAS 106 will maintain the allocation of bandwidth to the CBSD 102 as in step 206.

If, on the other hand, at step 214, the CBSD 102 stays too busy to transmit any heartbeat messages for more than 30 minutes, then, at step 216, the long CM timer expires and the CM 104 stops sending copies of its stored heartbeat message to the SAS 106, and, one minute later, at step 218, the SAS timer expires and the SAS 106 de-allocates bandwidth from the CBSD 102.

In some implementations, the CM 104 is unable to decode messages received from the CBSD 102 in order to distinguish heartbeat messages from other messages transmitted from the CBSD 102 to the SAS 106. In some embodiments, the CBSD 102 transmits different types of messages using different levels of transmit power such that the different types of messages arrive at the CM 104 with different receive power levels. In particular, the CBSD 102 is configured to transmit heartbeat messages at one or more heartbeat transmit power levels that are uniquely different from the power level(s) used to transmit all other types of messages. For example, in one possible implementation, the CBSD 102 transmits internet traffic at a power level of 10 dB, cellular traffic at a power level of 13 dB, and heartbeat messages at power levels above 13 dB. For example, if the CBSD 102 has four different bandwidth allocations, the CBSD 102 may transmit heartbeat messages for the first bandwidth allocation at 13.5 dB, heartbeat messages for the second bandwidth allocation at 14.0 dB, heartbeat messages for the third bandwidth allocation at 14.5 dB, and heartbeat messages for the fourth bandwidth allocation at 15.0 dB. In this way, the CM 104 can detect heartbeat messages by measuring the received power levels of all received messages and then thresholding those received power levels to distinguish heartbeat messages from other types of messages as well as heartbeat messages for different bandwidth allocations.

Note that the CM 104 is connected to a Cable Modem Termination System (CMTS) (not shown in FIG. 1). In order for the CM 104 to communicate with the CMTS, the CM 104 is calibrated when the CM 104 is initially integrated into the network such that the CM 104 will be able to distinguish the different receive power levels associated with different transmit power levels from the CBSD 102.

As indicated in FIG. 1, among other elements, the CBSD 102 has wireless transceivers (TRXs) for communicating with wireless user equipment (not shown), a wireline transceiver for communicating with the SAS 106 via the CM 104, a processor for controlling the operations of the CBSD 102, and memory for storing data and, in some implementations, software for controlling the operations of the processor. Similarly, the CM 104 has a first wireline transceiver for communicating with the CBSD 102, a second wireline transceiver for communicating with the SAS 106, a processor for controlling the operations of the CM 104, and memory for storing data and, in some implementations, software for controlling the operations of the processor.

In particular, the CBSD processor is configured to control the CBSD wireline transceiver to transmit heartbeat messages at a unique transmit power level. The first CM wireline transceiver is configured to measure the receive power level of messages received from the CBSD 102, and the CM processor is configured to maintain the long and short CM timers, threshold the receive power levels to detect heartbeat messages, store in the CM memory a copy of a heartbeat message received from the CBSD 102, and control the second CM wireline transceiver to transmit to the SAS 106 either a heartbeat message received from the CBSD 102 or a copy of the stored heartbeat message.

In some embodiments, the durations of the long and short CM timers are programmable parameters. In some implementations, the duration of at least the long CM timer is updated according to a pre-configured schedule. For example, for a CM associated with a CBRS at an arena, where the CBRS is capable of transmitting periodic heartbeat messages when the sports arena is not in use, but may be unable to transmit periodic heartbeat messages when the arena is filled with spectators using their wireless devices, the duration of the long CM timer may be updated according to the scheduled use of the arena, such that the long CM timer is set to a relatively small value (e.g., as small as 1 minute for a 1-minute SAS timer) when the arena is not in use, but set to a relatively large value (e.g., 3-4 hours) when the arena is scheduled to be used for a concert or sporting event.

In the scenario described above, the CBSD 102 is unable to transmit any heartbeat messages for 25 minutes. Those skilled in the art will understand that the described embodiment will be likewise able to maintain CBSD bandwidth allocation(s) in situations where the CBSD 102 is able to transmit heartbeat messages, but not necessarily frequently enough to avoid expiration of the SAS timer(s) otherwise. Assume, for example, that the CBSD 102 is unable to transmit heartbeat messages less than 1 minute apart, but is able to transmit heartbeat messages less than 5 minutes apart. In that case, the long CM timer(s) can be set, for example, to 5 minutes, even for an event at an arena that lasts for a number of hours. As long as the CBSD 102 is able to transmit even just one heartbeat message for each bandwidth allocation within every 5-minute period, the CM 104 will update both the short and long CM timers, and the SAS 106 will continue to maintain the bandwidth allocations for the CBSD 102.

Although the present disclosure has been described in the context of a 5G CBRS wireless network having a CBSD, a CM, and a SAS, those skilled in the art will understand that the disclosure can also be implemented in other wireless networks having a base station that communicates with a bandwidth manager via a modem.

In certain embodiments, the present disclosure is a modem for a wireless network having a base station configured to communicate with a bandwidth manager via the modem, wherein the bandwidth manager is configured to allocate wireless bandwidth to the base station. The modem comprises a first transceiver configured to receive heartbeat messages from the base station; a second transceiver configured to transmit the heartbeat messages to the bandwidth manager; a memory; and a processor configured to control the operations of the first and second transceivers and store and retrieve a copy of a heartbeat message in the memory. The processor is configured to maintain a long timer and a short timer for the base station such that (i) when the first transceiver receives a heartbeat message from the base station, the processor is configured to re-start the long and short timers and cause the second transceiver to transmit the heartbeat message to the bandwidth manager; (ii) when the short timer expires, the processor is configured to re-start the short timer and cause the second transceiver to transmit a copy of the stored heartbeat message to the bandwidth manager; and (iii) when the long timer expires, the processor is configured to stop causing the second transceiver to transmit a copy of the stored heartbeat message to the bandwidth manager.

In at least some of the above embodiments, the wire network is a 5G Citizens Broadband Radio Service (CBRS) network; the base station is a CBRS Device (CBSD); the bandwidth manager is a Spectrum Access System (SAS); and the modem is a cable modem.

In at least some of the above embodiments, the first transceiver is configured to measure receive power levels of messages received from the base station; and the processor is configured to threshold the receive power levels to distinguish the heartbeat messages from other types of messages transmitted by the base station.

In at least some of the above embodiments, the processor is configured to threshold the receive power levels to distinguish different heartbeat messages for different bandwidth allocations.

In at least some of the above embodiments, the processor is configured to update duration of the long timer based on a pre-configured schedule identifying periods of time when the base station might be unable to transmit heartbeat messages frequently enough to prevent the bandwidth manager from prematurely de-allocating the wireless bandwidth from the base station.

In at least some of the above embodiments, the processor is configured to maintain a short timer and a long timer for each of a plurality of different bandwidth allocations to the base station.

In certain other embodiments, the present disclosure is a base station for a wireless network, wherein (i) the base station is configured to communicate with a bandwidth manager via a modem and (ii) the bandwidth manager is configured to allocate wireless bandwidth to the base station. The base station comprises a transceiver configured to transmit messages to the bandwidth manager via the modem; and a processor configured to cause the transceiver to transmit (i) heartbeat messages at one or more heartbeat transmit power levels and (ii) all other types of messages at one or more power levels different from the heartbeat transmit power levels.

In at least some of the above embodiments, the wire network is a 5G CBRS network; the base station is a CBSD; the bandwidth manager is a SAS; and the modem is a cable modem.

In at least some of the above embodiments, the processor is configured to transmit heartbeat messages for each of a plurality of different bandwidth allocations to the base station.

In at least some of the above embodiments, the processor is configured to cause the transceiver to transmit heartbeat messages at two or more different heartbeat transmit power levels for two or more corresponding bandwidth allocations.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A modem for a wireless network having a base station configured to communicate with a bandwidth manager via the modem, wherein the bandwidth manager is configured to allocate wireless bandwidth to the base station, the modem comprising:
   a first transceiver configured to receive heartbeat messages from the base station;
   a second transceiver configured to transmit the heartbeat messages to the bandwidth manager;
   a memory; and
   a processor configured to control the operations of the first and second transceivers and store and retrieve a copy of a heartbeat message in the memory, wherein:
   the processor is configured to maintain a long timer and a short timer for the base station such that:
   the processor is configured to re-start the long and short timers and cause the second transceiver to transmit the heartbeat message to the bandwidth manager, upon the first transceiver receiving a heartbeat message from the base station;
   the processor is configured to re-start the short timer and cause the second transceiver to transmit a copy of the stored heartbeat message to the bandwidth manager, upon the short timer expiring; and
   the processor is configured to stop causing the second transceiver to transmit a copy of the stored heartbeat message to the bandwidth manager, upon the long timer expiring.

2. The modem of claim 1, wherein:
   the wire network is a 5G Citizens Broadband Radio Service (CBRS) network;
   the base station is a CBRS Device (CBSD);
   the bandwidth manager is a Spectrum Access System (SAS); and
   the modem is a cable modem.

3. The modem of claim 1, wherein:
   the first transceiver is configured to measure receive power levels of messages received from the base station; and
   the processor is configured to threshold the receive power levels to distinguish the heartbeat messages from other types of messages transmitted by the base station.

4. The modem of claim 3, wherein the processor is configured to threshold the receive power levels to distinguish different heartbeat messages for different bandwidth allocations.

5. The modem of claim 1, wherein the processor is configured to update duration of the long timer based on a pre-configured schedule identifying periods of time when the base station might be unable to transmit heartbeat messages frequently enough to prevent the bandwidth manager from prematurely de-allocating the wireless bandwidth from the base station.

6. The modem of claim 1, wherein the processor is configured to maintain a short timer and a long timer for each of a plurality of different bandwidth allocations to the base station.

7. A method for a modem for a wireless network having a base station that communicates with a bandwidth manager via the modem, wherein the bandwidth manager allocates wireless bandwidth to the base station, the method comprising:
   the modem receiving heartbeat messages from the base station;
   the modem transmitting the heartbeat messages to the bandwidth manager;
   the modem storing a copy of a heartbeat message; and
   the modem maintaining a long timer and a short timer for the base station such that:
   the modem re-starts the long and short timers and transmits the heartbeat message to the bandwidth manager, upon the modem receiving a heartbeat message from the base station;
   the modem re-starts the short timer and transmits a copy of the stored heartbeat message to the bandwidth manager, upon the short timer expiring; and
   the modem stops transmitting a copy of the stored heartbeat message to the bandwidth manager, upon the long timer expiring.

8. The method of claim 7, wherein:
   the wire network is a 5G CBRS network;
   the base station is a CBSD;
   the bandwidth manager is a SAS; and
   the modem is a cable modem.

9. The method of claim 7, wherein:
   the modem measures receive power levels of messages received from the base station; and
   the modem thresholds the receive power levels to distinguish the heartbeat messages from other types of messages transmitted by the base station.

10. The method of claim 9, wherein the modem thresholds the receive power levels to distinguish different heartbeat messages for different bandwidth allocations.

11. The method of claim 7, wherein the modem updates duration of the long timer based on a pre-configured schedule identifying periods of time when the base station might be unable to transmit heartbeat messages frequently enough to prevent the bandwidth manager from prematurely de-allocating the wireless bandwidth from the base station.

12. The method of claim 7, wherein the modem maintains a short timer and a long timer for each of a plurality of different bandwidth allocations to the base station.

13. A base station for a wireless network, wherein (i) the base station is configured to communicate with a bandwidth manager via a modem and (ii) the bandwidth manager is configured to allocate wireless bandwidth to the base station, the base station comprising:
   a transceiver configured to transmit messages to the bandwidth manager via the modem; and
   a processor configured to cause the transceiver to transmit (i) heartbeat messages at one or more heartbeat transmit power levels and (ii) all other types of messages at one or more power levels different from the heartbeat transmit power levels.

14. The base station of claim 13, wherein:
   the wire network is a 5G CBRS network;
   the base station is a CBSD;
   the bandwidth manager is a SAS; and
   the modem is a cable modem.

15. The base station of claim 13, wherein the processor is configured to transmit heartbeat messages for each of a plurality of different bandwidth allocations to the base station.

16. The base station of claim 15, wherein the processor is configured to cause the transceiver to transmit heartbeat messages at two or more different heartbeat transmit power levels for two or more corresponding bandwidth allocations.

17. A method for a base station for a wireless network, wherein (i) the base station communicates with a bandwidth manager via a modem and (ii) the bandwidth manager allocates wireless bandwidth to the base station, the method comprising:

the base station transmitting heartbeat messages at one or more heartbeat transmit power level; and the base station transmitting all other types of messages at one or more power levels different from the one or more heartbeat transmit power levels.

18. The method of claim 17, wherein:

the wire network is a 5G CBRS network;

the base station is a CBSD;

the bandwidth manager is a SAS; and the modem is a cable modem.

19. The method of claim 17, wherein the base station transmits heartbeat messages for each of a plurality of different bandwidth allocations to the base station.

20. The method of claim 19, wherein the base station transmits heartbeat messages at two or more different heartbeat transmit power levels for two or more corresponding bandwidth allocations.

* * * * *